(12) United States Patent
Lara

(10) Patent No.: US 9,289,002 B2
(45) Date of Patent: Mar. 22, 2016

(54) SHELL EGG PASTEURIZATION METHOD

(75) Inventor: Hector Gregorio Lara, Plainfield, IL (US)

(73) Assignee: National Pasteurized Eggs, Inc., Lansing, IL (US)

(*) Notice: Subject to any disclaimer, the term of this patent is extended or adjusted under 35 U.S.C. 154(b) by 398 days.

(21) Appl. No.: 12/792,409

(22) Filed: Jun. 2, 2010

(65) Prior Publication Data

US 2011/0300023 A1  Dec. 8, 2011

(51) Int. Cl.
*A23B 5/005* (2006.01)

(52) U.S. Cl.
CPC .................... *A23B 5/0052* (2013.01)

(58) Field of Classification Search
USPC .......... 426/298, 300, 301, 521, 614; 422/109; 99/516
See application file for complete search history.

(56) References Cited

U.S. PATENT DOCUMENTS

| | | |
|---|---|---|
| 5,431,939 A | 7/1995 | Cox et al. |
| 5,494,687 A | 2/1996 | Polster |
| 5,589,211 A | 12/1996 | Cox et al. |
| 5,843,505 A | 12/1998 | Davidson |
| 5,916,617 A | 6/1999 | Polster |
| 5,939,118 A | 8/1999 | Cox et al. |
| 5,993,886 A | 11/1999 | Polster |
| 6,004,603 A | 12/1999 | Vandepopuliere et al. |
| 6,035,647 A | 3/2000 | Polster |
| 6,103,284 A | 8/2000 | Polster |
| 6,113,961 A * | 9/2000 | Polster ............... 426/298 |
| 6,165,538 A | 12/2000 | Davidson |
| 6,187,348 B1 | 2/2001 | Polster |
| 6,291,003 B1 * | 9/2001 | Riemann et al. ......... 426/511 |
| 6,303,176 B1 | 10/2001 | Vandepopuliere et al. |
| 6,322,833 B1 | 11/2001 | Davidson |
| 6,410,071 B1 | 6/2002 | Polster |
| 6,528,101 B1 | 3/2003 | Polster |
| 6,632,464 B2 | 10/2003 | Davidson |
| 6,692,784 B2 | 2/2004 | Davidson |
| 6,974,599 B2 | 12/2005 | Vandepopuliere et al. |
| 2009/0078205 A1 * | 3/2009 | Hebrank ................. 119/6.8 |

FOREIGN PATENT DOCUMENTS

| | | |
|---|---|---|
| AU | 732534 | 4/2006 |
| CA | 2177164 | 9/1999 |
| CA | 2175823 | 7/2005 |
| CA | 2229270 | 1/2008 |
| DE | 69628307.7 | 5/2003 |
| EP | 845954 | 5/2003 |
| EP | 731642 | 3/2006 |
| EP | 1056360 | 4/2008 |
| WO | 95/14388 | 6/1995 |
| ZA | 94/08792 | 11/2005 |

* cited by examiner

*Primary Examiner* — Humera Sheikh
*Assistant Examiner* — Stephanie Cox
(74) *Attorney, Agent, or Firm* — Andrus Intellectual Property Law, LLP

(57) ABSTRACT

A batch processing control system for a shell egg pasteurizer controls the time and temperature in which batches of shell eggs are held in a pasteurization bath in accordance with a predetermined pasteurization protocol for designated egg size and start temperature. The predetermined pasteurization protocol is preferably statistically verified to optimize batches of eggs having the designated size and start temperature. The system also includes reporting software that generates daily reports to track each respective batch and verify that the batch has been pasteurized according to the statistically verified protocol.

9 Claims, 7 Drawing Sheets

156
160 ↙ 158
DAILY REPORT

| BATH NUMBER: | ⊙ BATH 1 ○ BATH 2 |
|---|---|

162

| REPORT START DATE/TIME: | ✕ | ✕ |
|---|---|---|
| REPORT END DATE/TIME: | ✕ | ✕ |

162

164　　　　　　　　　　　　164

| STARTING BATCH NUMBER: | 2528 | ENDING BATCH NUMBER: | 2640 |
|---|---|---|---|

| NUMBER OF BATCHES: | 113 | —166　　　　170— | |
|---|---|---|---|
| AVERAGE DURATION: | 0:40:04 | AVERAGE TEMPERATURE: | 134.18°F |

—168

174—

GRAPH
(SEE FIG. 6)

172—

CHART
(SEE FIG. 7)

FIG. 5

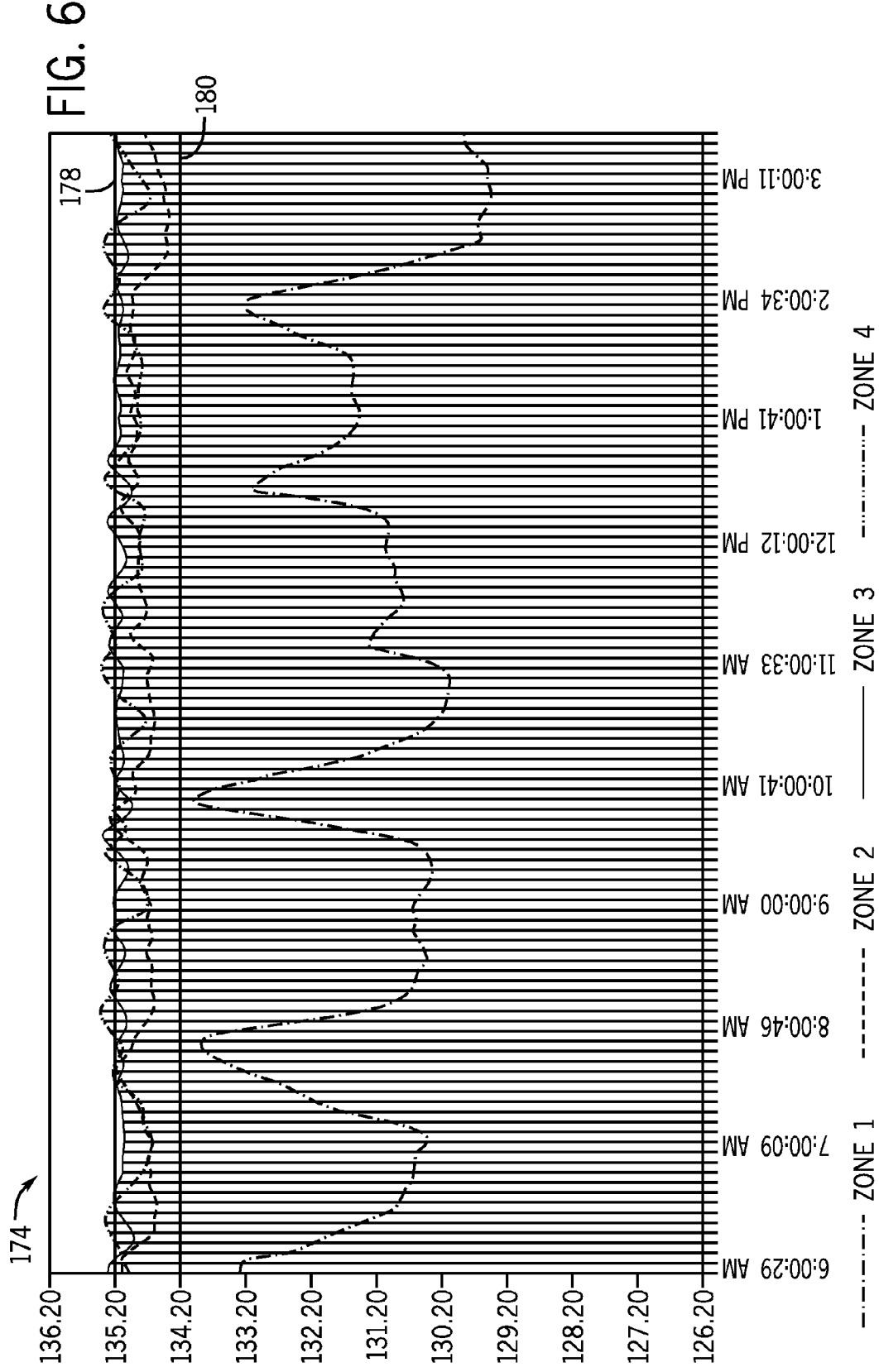

172 ⟶

| BATCH # | START TIME | DURATION | BATCH TYPE | | TEMPERATURE (°F) | | | | | | | |
|---|---|---|---|---|---|---|---|---|---|---|---|---|
| | | | | | ZONE 1 | C | ZONE 2 | C | ZONE 3 | C | ZONE 4 | AVERAGE |
| 2528 | 10/13/09 6:10:00 AM | 0:40:04 | M | 45 | 134.00 | ✓ | 134.99 | | 135.29 | ✓ | 135.08 | 134.84 |
| 2529 | 10/13/09 6:13:20 AM | 0:40:04 | M | 45 | 133.25 | ✓ | 135.09 | ✓ | 135.20 | ✓ | 135.06 | 134.65 |
| 2530 | 10/13/09 6:16:40 AM | 0:40:04 | M | 45 | 132.55 | ✓ | 134.98 | ✓ | 135.00 | | 135.16 | 134.42 |
| 2531 | 10/13/09 6:20:00 AM | 0:40:04 | M | 45 | 132.19 | ✓ | 134.74 | ✓ | 134.91 | | 135.28 | 134.28 |
| 2532 | 10/13/09 6:23:20 AM | 0:40:04 | M | 45 | 131.83 | ✓ | 134.59 | ✓ | 134.96 | | 135.31 | 134.17 |
| ... | | | | | | | | | | | | |
| 2636 | 10/13/09 3:50:00 PM | 0:40:04 | M | 45 | 129.53 | ✓ | 134.44 | ✓ | 135.08 | ✓ | 134.78 | 133.46 |
| 2637 | 10/13/09 3:53:20 PM | 0:40:04 | M | 45 | 129.49 | ✓ | 134.54 | ✓ | 135.07 | ✓ | 134.89 | 133.50 |
| 2638 | 10/13/09 3:56:40 PM | 0:40:04 | M | 45 | 129.46 | ✓ | 134.54 | ✓ | 135.10 | ✓ | 135.00 | 133.53 |
| 2639 | 10/13/09 4:00:00 PM | 0:40:04 | M | 45 | 129.65 | ✓ | 134.58 | ✓ | 135.15 | | 135.12 | 133.62 |
| 2640 | 10/13/09 4:03:20 PM | 0:40:04 | M | 45 | 122.81 | ✓ | 134.68 | ✓ | 135.18 | | 135.26 | 133.73 |

FIG. 7

SHELL EGG PASTEURIZATION METHOD

FIELD OF THE INVENTION

The invention relates to shell egg pasteurization systems, and in particular the control of such systems to optimize the pasteurization process in accordance with predetermined statistically verified pasteurization protocols. The invention also pertains to data reporting for verifying that each batch of eggs has been pasteurized according to the predetermined protocol.

BACKGROUND OF THE INVENTION

The Assignee of the present application owns several patents pertaining to the pasteurization of shell eggs including for example Cox et al. U.S. Pat. No. 5,589,211, and Davidson U.S. Pat. No. 6,322,833, each of which is incorporated herein by reference. In general, commercialized pasteurization processes involve the use of a fluid pasteurization medium, such as heated water, heated oil, heated air or steam. In some systems, batches of shell eggs are submerged into a heated bath and moved sequentially from zone to zone in order to complete the pasteurization process. Other systems do not move the batches of eggs sequentially through the bath but hold each batch in place for the duration of the pasteurization process. Certain aspects of the present invention apply to both types of systems. In either case, the purpose of the process is to heat the entire mass of the egg such that the center of the egg yolk warms to an adequate temperature for a sufficient amount of time to pasteurize the egg and meet or exceed an accepted standard for reduction of *Salmonella Enteriditis* without cooking the egg. A 5 log reduction in *salmonella* is the regulated standard set by the FDA for a shell egg to be labeled as pasteurized. In some cases, it may be desirable to achieve at least a 7 log reduction or more. Also in some jurisdictions, a lower standard such as 2 or 3 log reduction may be acceptable. Pasteurization has been shown to kill other food born pathogens as well. After pasteurization, the eggs can optionally be coated with FDA approved food-grade wax or other sealant containing antibacterial properties to further protect the eggs from outside contaminants. After pasteurization and sealing, the exterior of the eggs are dried, cooled and packed for storage, preferably at or below 45° F. It is typical to label the pasteurized eggs as pasteurized.

Once pasteurized, the eggs are safe for consumption even if raw or partially cooked. It is still recommended, although not required by U.S. regulations, to refrigerate pasteurized eggs during shipment and storage in order to extend shelf-life and to maintain high egg quality and functionality. Conversely, unpasteurized eggs are required by U.S. regulations to be refrigerated because they are a potentially hazardous food which poses a recognized *salmonella* health risk. Pasteurized shell eggs, on the other hand, no longer carry significant quantities of *salmonella* because the pasteurization process destroys all or almost all of the bacteria.

Just as it is important to uniformly heat the entire mass of the egg to a given temperature for the required period of time, it is also important not to overheat the egg during the pasteurization process. Overheating can result in partial cooking or loss in the quality and functionality of the egg. There are many methods for measuring egg quality and functionality, see for instance the methods discussed in above incorporated U.S. Pat. No. 6,322,833. One of the most common functionality tests is the albumen functionality test which measures egg white quality in Haugh units. As an egg ages, the thick portion of the egg white tends to thin. Haugh units are calculated using both the egg weight and the height of the thick albumen. Standard Haugh unit values for different grades of eggs are follows: Grade AA is greater than 72 Haugh units, Grade A is between 60 and 72 Haugh units, and Grade B is less than 60 Haugh units. The USDA (United States Department of Agriculture) requires that all eggs for human consumption be graded both in terms of weight (minimum weight requirements for applicable size, Medium, Large and Extra-Large) and quality (Grade AA, Grade A, Grade B).

One of the primary difficulties presented with shell egg pasteurization is that eggs come in different sizes, weights and have different heat transfer characteristics. For example, the time in which an extra large egg is required to be submerged within a water bath at a given temperature for pasteurization (e.g. to achieve a 5 log reduction in *salmonella*) would likely partially denature the albumen or at least compromise the functionality of a medium sized egg. In addition to different egg size and quality, the starting temperature of the egg at the beginning of the pasteurization process must be taken into account as well. For this reason, it may be desirable to let refrigerated batches of eggs stand at room temperature or in a warming bath prior to pasteurization.

In prior art batch processing pasteurization equipment using a heated water bath, each batch contains many dozens of eggs typically arranged in flats and stacked one upon another, for example, as described in U.S. Pat. No. 6,113,961 which is also incorporated herein by reference. The design of the flats facilitates effective, even access of heated water to the eggs physically located in the middle of the batch. Pressurized air can be supplied through openings into the water bath to cause perturbation and facilitate effective heat transfer as also discussed in the U.S. Pat. No. 6,113,961. In one prior art system, each batch of eggs is held in a carrier that is supported by a gantry located above the water bath and is moved in three (3) stages through each of four (4) zones in the water bath. An advance motor moves the respective carriers sequentially from stage to stage and zone to zone at fixed time intervals.

FIG. 1 illustrates a prior art temperature control system 10 for a pasteurizer water bath. The system 10 includes a programmable logic control (PLC) 12 that controls the temperature within each of the zones 14 in the pasteurizer water bath. FIG. 1 schematically depicts the PLC 12 controlling the water temperature in one of the zones 14 in the water bath. Temperature sensors 16 are located within the water bath in each zone 14, and provide temperature signals to the PLC 12. Heating coils 18 are located in each zone 14 of the water bath. The PLC 12 controls the operation of a boiler 20 and a control valve 22 to provide heat to the respective heating coils 18 when required. The set temperature for the PLC 12 is different depending on the size of the eggs, e.g. medium sized eggs have a lower set temperature than large or extra large eggs. The level of air pressure and the motor advance rate are not controlled by the PLC 12, and are generally fixed and not changed after the system 10 has been installed and set up for operation. The system 10 also includes a water level sensor 24 that provides a signal to the PLC 12. When the water level in the water bath 14 falls below the sensor level 24, the PLC 12 opens valve 26 to add cold water to the water bath. The system 10 and the PLC 12, however, do not control the cold water valve 26 in response to the temperature sensor 16. In the prior art system 10, the PLC 12 is able to communicate with a computer 28 to allow an operator or supervisor to view data on the PLC 12, e.g., check alarm status to ensure that the system 10 is operating properly and that the temperature in any given zone has not drifted outside of a desired temperature range.

As mentioned, a batch of medium eggs weighs substantially less than a batch of large eggs or extra large eggs, and hence will have significantly lower thermal capacity. When a batch of eggs is introduced into the water bath, it immediately absorbs a large amount of energy because of the large temperature difference between the eggs and the water bath temperature. As the batch of eggs warms to or near the water bath temperature, the speed and the amount of heat transfer from the water bath to the eggs lessens. However, large and extra large eggs typically have more of an impact on the bath temperature in the initial zone than medium sized eggs, and the start temperature (e.g. refrigerated or room temperature) of the batch of eggs also has a significant impact on the temperature in the initial zone.

One object of the present invention is to provide the ability to pasteurize shell eggs not only at optimized bath temperatures, but also for optimized dwell times in the respective zones in the bath depending on egg size, weight and the starting temperature of the particular batches of eggs.

Certification of proper pasteurization requires verification checks on bath temperature and processing times to confirm that an approved pasteurization protocol (e.g. verified to meet FDA standards) has been employed and that equipment is performing in accordance with the protocol. While the prior art system allows the operator or supervisor to check the current status of the system and the temperature sensors via a connected computer 28, it does not provide data acquisition and reporting capabilities. Another object of the invention is to provide data acquisition and reporting capabilities in a manner that fosters thorough, convenient confirmation of batch compliance with approved pasteurization protocols.

Also, in the event that the pasteurization process falls out of compliance for one or more batches, it is important that these batches be removed from downstream processing and packaging. Another object of the invention is to provide an on-site alarm signal that indicates to system operators when a batch needs to be removed from the processing stream.

SUMMARY OF THE INVENTION

The invention pertains to shell egg pasteurization systems that use a bath filled with a fluid pasteurization medium, such as heated water, heated air, heated oil, or steam. In a preferred embodiment of the invention, batches of shell eggs are sequentially moved in stages through a series of multiple zones in the bath to pasteurize the eggs. As mentioned previously, however, many aspects of the invention can be implemented in a system in which the batches of eggs are held in place such as in an incubator or a warming oven. In accordance with the invention, a batch processing control system including, e.g. a programmable logic controller (PLC), is programmed to control both the temperature of the fluid pasteurization medium and the period of time in which each batch of eggs is held in the heated fluid pasteurization medium during the pasteurization process. The dwell time and temperature are controlled in accordance with a predetermined pasteurization protocol for batches of eggs having a designated size and start temperature. The predetermined pasteurization protocol should be statistically verified to ensure that the central portion of the egg yolk is heated to a sufficient temperature for a sufficient period of time to achieve a desired, pre-selected reduction in *salmonella* species present in the egg yolk for an egg having the designated size and start temperature. However, the predetermined protocol should also be statistically vertical to ensure that heating does not substantially affecting the albumen functionality of the egg measured in Haugh units compared to the albumen functionality of a corresponding unpasteurized egg. In the U.S., it is expected that the predetermined pasteurization protocol for time and temperature will be statistically verified to achieve at least a 5 log reduction in *salmonella* species for an egg having the designated size and start temperature.

The invention facilitates the use of optimized dwell time and temperature protocols for batches of shell eggs having various sizes, weights and start temperatures. The statistically verified pasteurization protocol defines one or more predetermined temperature ranges assigned to at least a portion of the total dwell time. That is to say, it may be desirable to hold the temperature of the fluid pasteurization medium at or near a constant temperature throughout the duration that the batch is in the bath undergoing pasteurization. On the other hand, it may be desirable to allow the temperature to fluctuate as the batch of shell eggs proceeds through the various stages of the pasteurization process. In particular, it may be desirable to heat the fluid pasteurization medium to a higher temperature in the beginning stages of the pasteurization process than in the later stages of the pasteurization process. The programmed PLC controls the heating system for heating the fluid pasteurization medium in the bath in response to signals from one or more temperature sensors located in the bath. In a system in which the batches of eggs are moved sequentially through the bath, the programmed PLC also controls the motor advance to move the batches of eggs from stage to stage and through the zones in accordance with the predetermined protocol. In any event, it is desirable that several predetermined protocols be available for implementation on the PLC, each being optimized for batches having a specified egg size and start temperature.

In another aspect of the invention, the batch processing control system includes a programmable logic controller (PLC) that is programmed with one or more proportional-integral-derivative (PID) algorithms to precisely control the temperature of the fluid pasteurization medium. In the preferred embodiment of the invention in which batches of eggs are moved sequentially through various stages in the bath of heated fluid pasteurization medium, it is preferred that the system include multiple independently controlled heating elements, each of which is controlled by a dedicated PID algorithm within the PLC. One or more temperature sensors, such as a thermocouple is associated with each heating element and is located in the fluid pasteurization medium in order to monitor the temperature in the general vicinity of the respective heating element. The PID control algorithm for the heating element uses a temperature set point value defined by the predetermined pasteurization protocol being implemented on the PLC to operate the pasteurization system. For each sampling cycle, the PID control algorithm receives a temperature feedback signal that is provided to the PLC from the at least one temperature sensor associated with the heating element. The PID control algorithm generates a control signal based on the difference between the temperature set point value defined by the predetermined pasteurization protocol and the temperature feedback signal provided to the PLC from the at least one temperature sensor. The control signal is transmitted from the PLC to an electronically controlled valve in order to control operation of the respective heating element. It is contemplated that a multiple zone pasteurization bath may include, e.g., 12 to 40 independently controlled heating elements. On the other hand, this type of control system can also be useful for controlling systems having few number of heating elements or even a single heating element. In any event, use of the PID control algorithms enables the system to closely control the temperature of the fluid pasteurization medium so that it remains within the preselected temperature range defined by the statistically verified protocol.

As mentioned, in system in which the batch of eggs are moved sequentially through the bath, there can be a substantial temperature difference between the eggs and the fluid pasteurization medium, e.g. water, when a batch of eggs is initially placed in the first stage of the first zone. This temperature difference typically causes the first zone to cool initially below the lower control temperature. While the reduced temperature in the first zone may not compromise the overall pasteurization process as long as the protocol compensates for the temperature sag, the use of PID control algorithms and the ability to independently control each of the various heating elements can help reduce the magnitude of the temperature sag and accelerate temperature recovery. Also, the ability to hold the initial zone at a higher temperature than the remaining zones in the water bath may allow the use of pasteurization protocols having lower overall dwell time, thereby improving system throughput.

As mentioned, the primary purpose of the first zone is to bring the eggs up to the pasteurization temperature preferably at or above 128° F. *Salmonella* species are destroyed primarily in the final three zones of the process, where the egg temperature is maintained at or near an optimized pasteurization temperature. When determining the parameters for the statistically verified pasteurization protocol, particular close attention should therefore be paid to maintaining the appropriate temperature in the zones downstream from the initial zone. With this in mind, bath temperature range and dwell time should be chosen for each combination of egg size (extra large, large, and medium) and batch starting temperature (e.g. refrigerated at 45° F., or room temperature) in order to ensure full pasteurization without adversely affecting egg quality and functionality after pasteurization. The use of independently controlled heating elements allows great flexibility in developing and obtaining optimized pasteurization protocols.

In accordance with another aspect of the invention, an on-site alarm is provided at the exit of the pasteurizer. The alarm, for example a visual alarm such as a red light and/or an audio alarm, activates to indicate that an exiting batch of eggs has fallen out of compliance with the respect to statistically verified protocol programmed on the PLC for the given batch.

Another aspect of the invention is directed to data acquisition and reporting. More specifically, a personal computer programmed with reporting software receives data, preferably on a real-time basis, from the on-site batch processing control system. The data communication between the personal computer and the PLC for the on-site batch processing control system can occur in any number of manners known to those skilled in the art. For example, the computer can be located remotely, and the communication can take place via the internet, or the computer can be located on-site. In addition, multiple computers can communicate with the PLC if desired. In accordance with the invention, the computer communicates with the PLC to gather reliable data regarding the status of the pasteurization process for each batch of eggs being processed. The data gathered for each batch of shell eggs includes a batch identification number or the like, an identification of the type of batch (size of eggs, start temperature, etc.), the start time for each batch, and the temperature of the bath in the zone that the batch is located at a particular time. Preferably, the computer software also allows the operator or a remote supervisor to also review the status of equipment and components on site, including bath temperatures.

The software preferably generates a printable report containing compliance data for all batches of eggs pasteurized for a given day through the pasteurizer. In its preferred format, the report tracks each batch through the pasteurization process, and importantly provides information that is needed to verify that each batch has been adequately pasteurized. The report documents that each batch of eggs have been exposed to the fluid pasteurization medium for an appropriate amount of time within the predefined temperature range defined by the statistically verified protocol for the appropriate egg size and start temperature. The preferred report format includes average temperatures for the fluid pasteurization medium while the respective batch of eggs is located in each of the zones. In a preferred embodiment of the invention, the report includes an indicator (such as check mark) of whether the temperature in any one of the zones has fallen out of compliance while a batch is located within that zone. The temperature of the first zone, of course, may not be as critical, because the primary purpose of the first zone is to bring the eggs up to the pasteurization temperature whereas the primary purpose of the following zones is to pasteurize the eggs. The report can be used to certify that batches of shell eggs have been pasteurized in accordance with a relevant standard, e.g. the 5 log *salmonella* reduction standard mentioned above; and, in particular pasteurized in accordance with a statistically verified time and temperature protocol. Desirably, the data for each batch is also provided in a graphical plot which includes a representation of the lower control temperature and the upper control temperature for the preselected temperature range thereby providing convenient recognition of whether the monitored temperature in one or more of the zones has fallen out of compliance during the pasteurization process. In a preferred embodiment of the invention, the plot also includes an average temperature calculation for each batch which ignores the bath temperature while the batch is in the initial zone and calculates the average based on the temperature in the remaining zones.

Other aspects and objects of the invention shall be apparent to those of ordinary skill in the art upon reviewing the following drawings and description thereof.

BRIEF DESCRIPTION OF THE DRAWINGS

FIG. 5 depicts a computer report generated in accordance with the preferred embodiment of the invention.

FIG. 6 depicts a data graph constituting part of the report illustrated in FIG. 5.

FIG. 7 illustrates a data chart constituting part of the report in FIG. 5.

DETAILED DESCRIPTION

Figure 2:
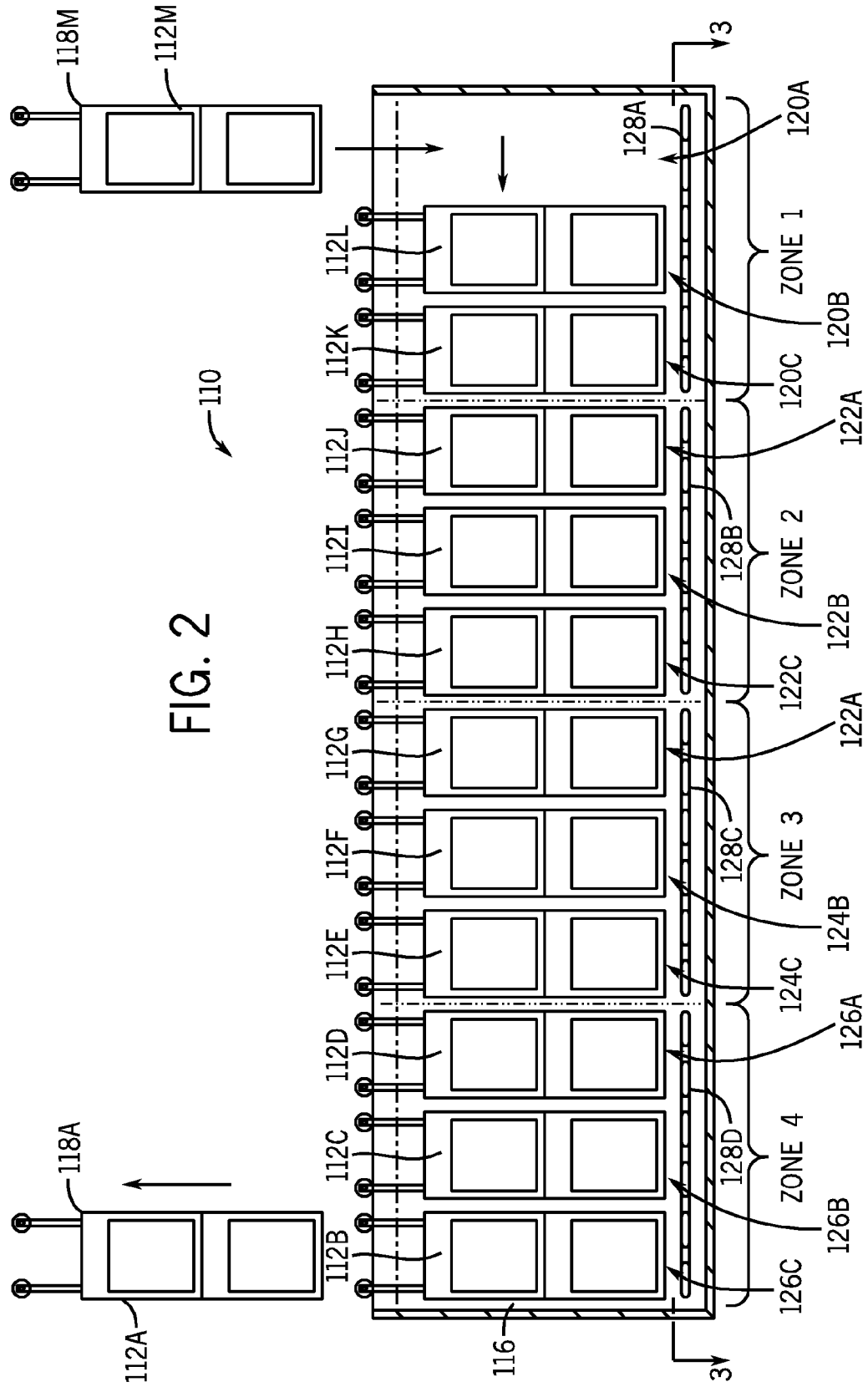
FIG. 2 is a schematic drawing illustrating the movement of batches of eggs through multiple zones in an exemplary shell egg pasteurization system.
Figure 3:
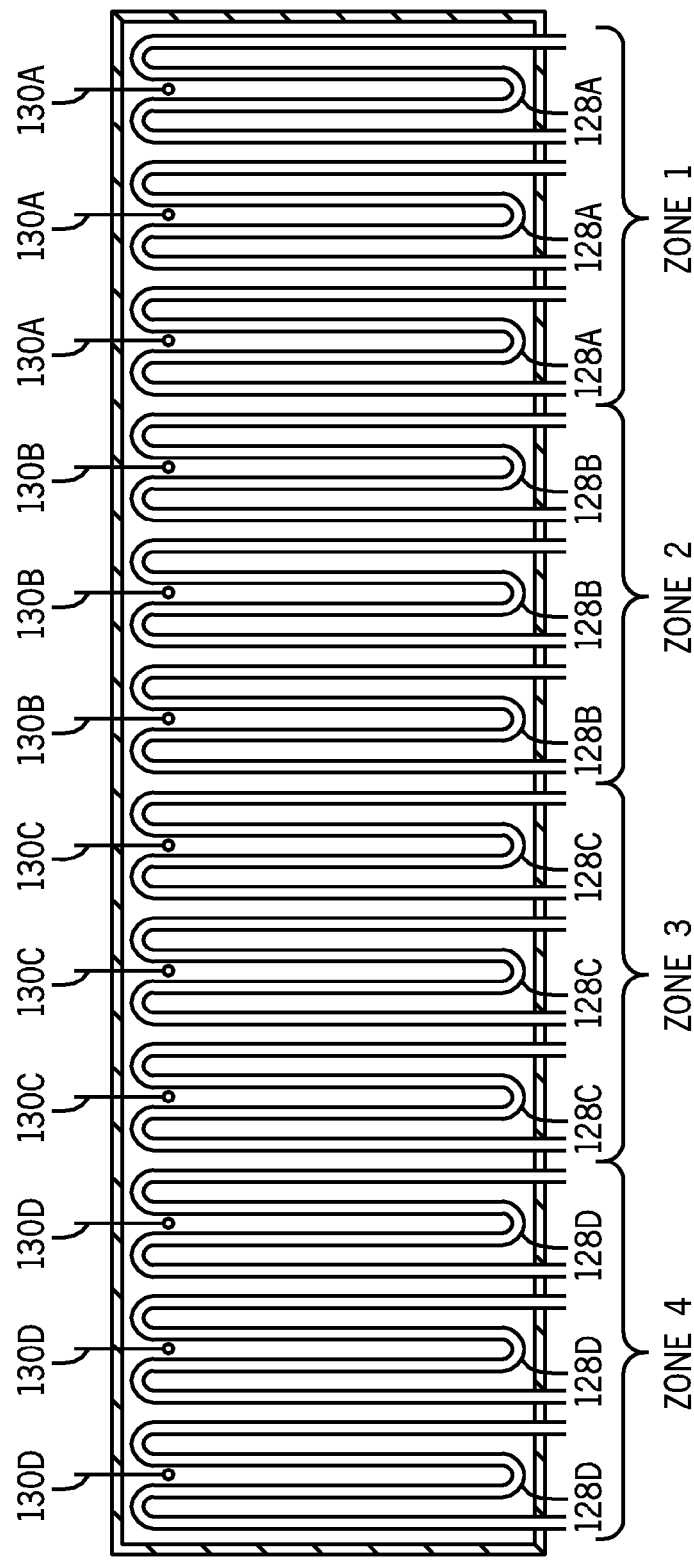
FIG. 3 is a view taken along line 3-3 in FIG. 2.

FIGS. 2 and 3 illustrate a shell egg pasteurization system 110 in which batches 112A through 112M of eggs are passed through four zones (Zones 1 through 4) of a pasteurization bath 116. In commercial operations, it is not efficient or cost effective to pasteurize a single egg, a single row or even a single layer of shell eggs at a time. Therefore, it is known in the art to pasteurize batches of eggs containing several stacked layers of eggs. For example, a flat may contain 2-½ dozen eggs, with a stack containing four layers of flats and each batch containing 16 stacks loaded onto a carrier 118A through 118M. Generally speaking, the bath 116 must heat not only the eggs, but also the flats and the carriers. Even though the carriers 118A-118M and the flats are typically the same whether the eggs being pasteurized are medium size, large, ex-large or jumbo, the different size and weight of the eggs as well as the potentially different starting temperature for the eggs in the batch will normally impact the temperature in Zone 1 of the bath 116 differently. Further, the weight of two different stacks of medium-sized eggs is potentially different, and the same is true of the weight of two stacks of large eggs, ex-large eggs, etc. Therefore, even though the same sized eggs are being processed, the effect that a given batch has when it enters the pasteurization bath 116 can vary.

As shown in FIG. 2, each zone in the pasteurization bath 116 includes a first, second and third staging position, 120A, 120B, and 120C for Zone 1, 122A, 122B, 122C for Zone 2, 124A, 124B, 124C for Zone 3 and 126A, 126B, 126C for Zone 4. There are therefore 12 staging positions within the bath 116 shown in the embodiment in FIG. 2. FIG. 2 also shows a carrier 118M containing batch 112M of eggs prior to being placed in the bath 116, and carrier 118A containing batch 112A of eggs which has been removed from the bath at 116 after pasteurization. Note that the carriers 118B through 118L containing batches of eggs 112B through 112L are located within the bath 116 and have been moved forward one stage in preparation for the bath 116 to receive carrier 118M and batch 112M in the first staging position 120A of Zone 1.

As shown in FIG. 2, the fluid pasteurization medium, e.g. heated water, in the bath 116 is allowed to flow between zones inasmuch as Zones 1, 2, 3 and 4 are physically continuous. It should be understood, however, that the schematic representation of the system 110 in FIG. 2 is merely representative of the types of systems on which the invention may be used, and that the invention may be useful with other types of pasteurization systems. For example, it is well within the scope of invention to physically separate the zones of the bath into two or more physically separate compartments. Likewise, the fluid pasteurization medium may be steam, heated oil, heated air, or some other heat transfer medium. Also, as mentioned previously, many aspects of the invention are applicable to pasteurization systems in which the batches of eggs are held in place throughout the entire pasteurization process, such as in an incubator or oven.

Referring still to FIGS. 2 and 3 in which the fluid pasteurization medium is water or some other liquid, sets of heating coils 128A through 128D are located in each respective zone to heat the fluid within the zone. In accordance with preferred embodiment of the invention, each of the heating coils in each set of heating coils 128A through 128D are controlled independently. Temperature sensors 130A, 130B, 130C and 130D, such as thermocouples, are located in each zone of the bath 116. As shown in FIG. 3, a thermocouple 130A through 130D is located in the general vicinity of each respective heating element 128A through 128D. While the invention can be implemented with a single thermocouple associated with each heating element, one of ordinary skill in the art will understand that it is possible to use additional thermocouples in the vicinity of the respective heating elements for purposes of redundancy and averaging. If the fluid pasteurization medium is water, it may be desirable to inject pressurized air into the bath 116, see incorporated U.S. Pat. No. 6,113,961. The temperature sensors 130 are electrically connected to a programmable logic controller (PLC) 132 for the control system 134, FIG. 4.

Figure 1:
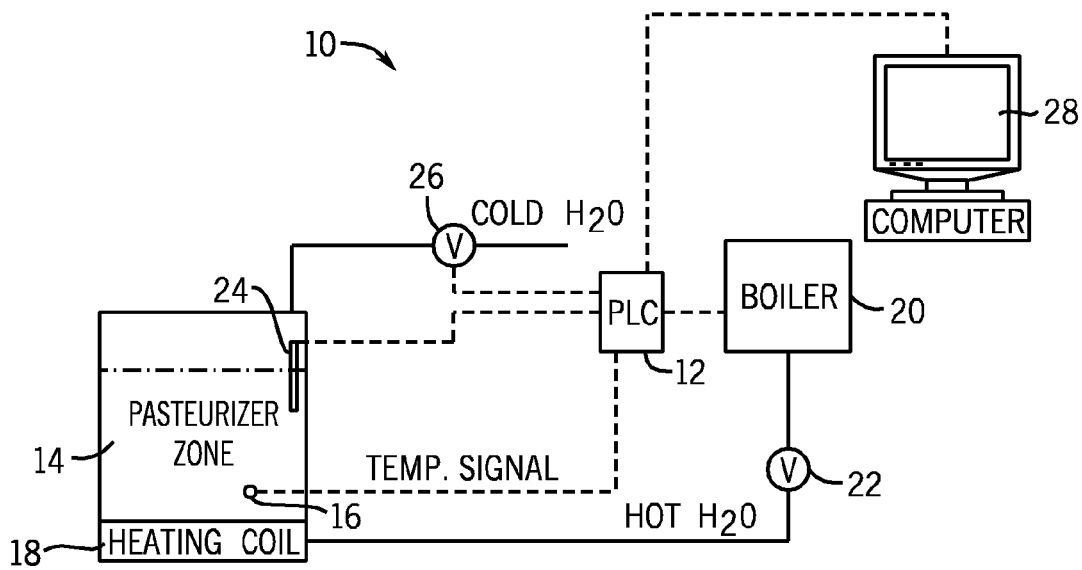
FIG. 1 schematically illustrates a prior art temperature control system for an exemplary shell egg pasteurization system.
Figure 4:
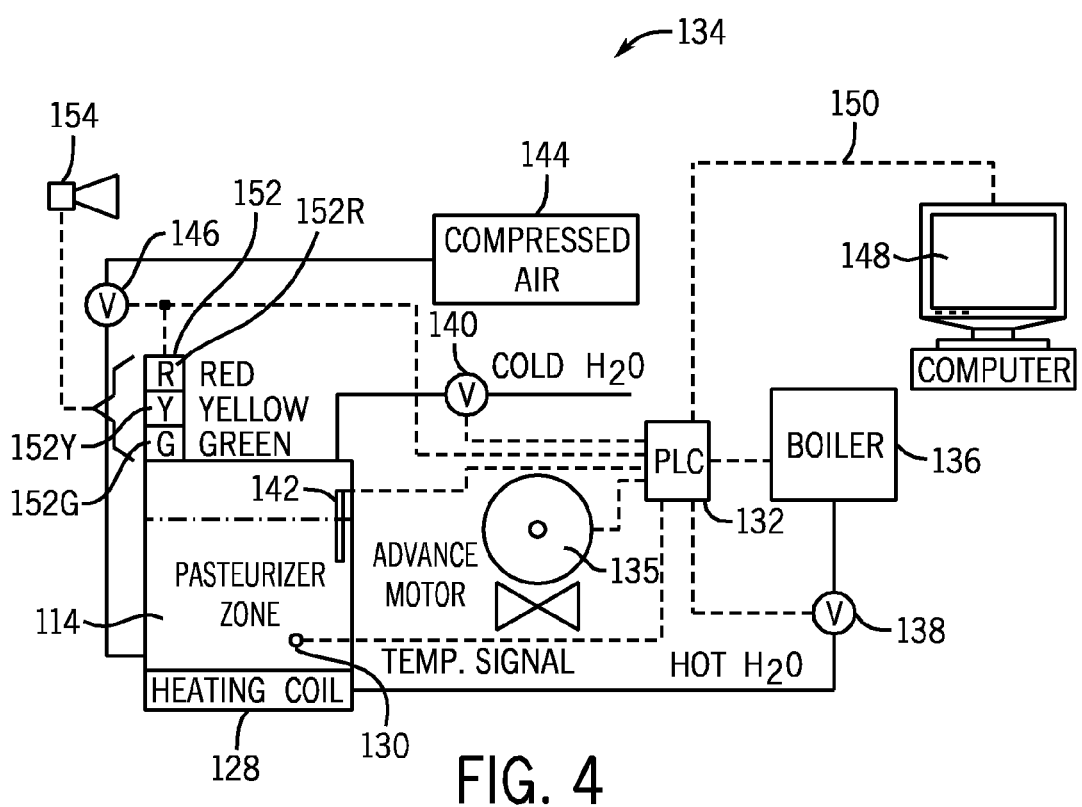
FIG. 4 schematically illustrates a time and temperature control system constructed in accordance with the invention for use in the exemplary shell egg pasteurization system of FIG. 2.

FIG. 4 schematically illustrates a time and temperature control system 134 constructed in accordance with the invention for a shell egg pasteurizer, such as pasteurizer 110 shown in FIGS. 2 and 3. In particular, the time and temperature control system 134 is a batch processing control system, that controls both the temperature of the fluid pasteurization medium 116 near the respective heating elements 128A through 128D as well as the movement of the advance motor 135 to advance the batches 112A, 112M from stage to stage and zone to zone. The PLC 132 is programmed in accordance with a predetermined pasteurization protocol for batches of eggs having the designated size and start temperature. Several prior patents including Cox U.S. Pat. No. 5,589,211; Davidson U.S. Pat. No. 6,322,833; Vandepopuliere et al. U.S. Pat. No. 6,974,599 describe the importance of pasteurization time and temperature. These patents as well as others namely Polster U.S. Pat. No. 5,993,886, discuss the importance of maintaining the internal temperature of the eggs at an appropriate temperature for a sufficient amount of time to achieve a desired log kill rate of *salmonella*. However, shell egg pasteurization equipment in the prior art does not enable the operator to adjust the pasteurization time and temperature by programming the PLC with a protocol that is vertified for batches of eggs having a given size and start temperature.

The invention ensures appropriate pasteurization by operating the equipment in accordance with a statistically verified protocol for pasteurizing the eggs with the designated size and start temperature. The preferred way to statistically verify the pasteurization protocol for time and temperature is to run tests in which sample shell eggs are tested during the process for temperature at the central portion of egg yolk as well as *salmonella* kill rate, and/or kill rate for other pathogens if desired. It is expected that the pasteurization protocol for time and temperature for the given egg size and start temperature will be statistically verified to maintain a central portion of the egg yolk at sufficient temperature level for a sufficient period of time necessary to achieve the desired reduction in *salmonella* species, but insufficient to substantially affect the albumen functionality of the pasteurized egg as measured in Haugh units compared to the albumen functionality of a corresponding unpasteurized egg. The pre-selected reduction in *salmonella* species or other pathogen will typically be a 5 log reduction in *salmonella* in order to meet the standards set by the U.S. FDA for a shell egg to be labeled as pasteurized, but may be another level such as a 3 log reduction for jurisdictions having lower standards, or a 7 log reduction when higher standards are desired.

The PLC 132 preferably contains uploaded software in a machine readable form on a data storage device or in memory that is able to implement a plurality of predetermined pasteurization protocols, each being statistically verified, and each being customized for a distinct combination of egg size and start temperature. For example, the controller 132 may contain six formulas: one pair of formulas for full batches of medium sized eggs with one at a start temperature of 45° F. and the other at a start temperature at room temperature; a second pair of formulas for full batches of large sized eggs with one formula for a start temperature of 45° F. and the other at a start temperature at room temperature; and a third pair of formulas for full batches of ex-large sized eggs again with one formula with a start temperature of 45° F. and another formula for a start temperature at room temperature. Each formula will likely have a unique dwell time, as well as one or more unique target temperatures. For example, the total dwell time for a batch of medium sized eggs having a start temperature equal to room temperature may be 48 minutes, which means that each batch of eggs spends 12 minutes in each of the four zones as the batch 12 moves through the pasteurizer 116. In the system 110 shown in FIGS. 2 and 3, individual batches 118M would be placed within the pasteurizer bath 116 every four minutes according to this hypothetical protocol, and each batch 118A-L would remain in each stage 120A-120C, 122A-122C, 124A-124C, 126A-126C for four minutes. Referring again to FIG. 4, the PLC is programmed to hold each batch of shell eggs 112A-112M in each of the respective zones 114A-114D for a preselected period of time, and the PLC 132 will transmit a control signal to the motor advance 135 accordingly.

Figure 4A:
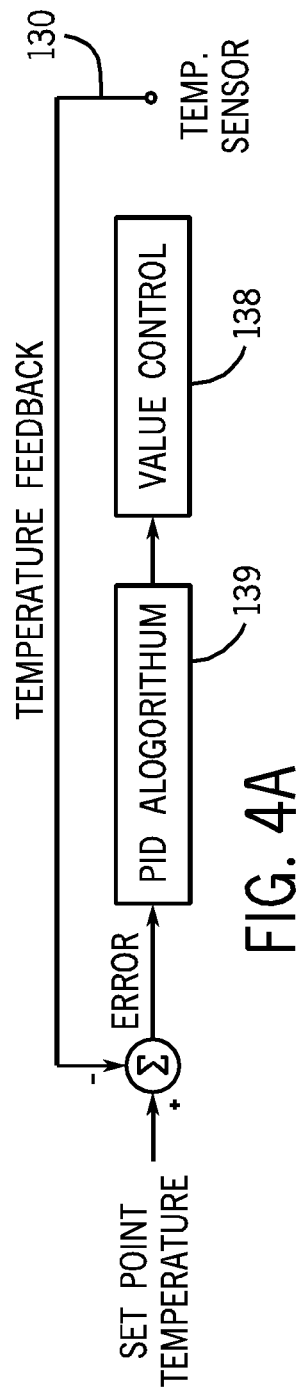
FIG. 4A is a schematic illustration of a PID algorithm used to individually control a heating element in accordance with the preferred embodiment of the invention.

FIG. 4 shows the PLC 132 controlling one heating coil 128, although it should be understood that in the system illustrated in FIGS. 2 and 3 that the PLC 132 will independently control each of the 12 heating elements 128A-128D. As shown in FIG. 4, for each heating element 128, the PLC 132 receives a signal from at least one temperature sensor 130. In particular, an electronically controlled valve 138 controls the flow of heated water from the boiler 136 to the respective heating element 128. In other words, there is a separate electronically controlled valve 138 for each of the twelve heating elements 128. Referring to FIG. 4A, the PLC uses a proportional-integral-derivative (PID) algorithm, block 139, to control the operation of each heating element 128 independently. For example, in the system shown in FIGS. 2 and 3, the PLC will be programmed with 12 separate PID algorithms to control the operation of the heating elements 128. The temperature of the fluid pasteurization medium in the vicinity of the respective heating element 128 is continuously monitored by the respective temperature sensor 130. The loop time for the PID algorithm is preferably five seconds although other loop times may be used in accordance with the invention. PID algorithms are generally known in the art. The set point temperature value for the heating element is defined by the predetermined pasteurization protocol. The difference between the set point temperature value and the temperature feedback signal from the temperature sensor 130 results in an error signal that drives the PID algorithm 139. The set point temperature value for the heating element may be constant throughout the entire dwell time, or may be defined by the predetermined pasteurization protocol to vary with the dwell time. In any event, the error signal drives the PID algorithm to generate a control signal that is transmitted to the valve control 138. The proportional aspect of the PID algorithm pertains to the severity of the error gap and uses a constant to calculate the amount of time the valve should be open to eliminate the gap. The integral aspect essentially measures how long the error gap has occurred, and the derivative aspect measures the rate of change of the proportional aspect. Each of these various aspects is combined to generate a control signal transmitted to the electronic valve 138 for each cycle of the loop. Preferably, the control signal is a value between zero and one and represents the percentage of time that the valve 138 will be open for the 5 second loop interval. For example, if the generated control signal from the HD algorithm is one, the valve will remain open to allow the flow of hot water to the heating element 128 for the entire 5 second cycle. On the other hand, if the generated control signal is only 0.8, the valve will be open for 4 out of 5 seconds. In this manner, the PLC 132 precisely controls the operation of each individual heating element 128, thereby preventing large swings in temperature.

Preferably, a separate PID algorithm is used to control the temperature of the water supplied by the boiler 136, for example at about 170° F.

While the set point temperature value is a precise target value for the temperature of the bath in the vicinity of the respective heating element 128, the predefined pasteurization protocol will normally include a defined range, for example a half of degree Fahrenheit above or below the set point temperature value which is acceptable for implementing the protocol. The use of the multiple individually controlled heating elements is effective in maintaining the temperature of the fluid pasteurization medium within the desired temperature range. If, however, the temperature in one or more areas of the pasteurization bath approaches the upper control temperature, the PLC 132 will operate the cold water flow valve 140 to add cold water to the bath. Typically, there will only be one cold water valve, although in accordance with the invention there may be several. In any event, it is desirable that the operation of the cold water valve be controlled by a separate PID algorithm in the PLC, and if the system includes multiple cold water valves that each one be independently controlled.

The system also includes a level sensor 142 that senses the level of water in the pasteurizer. As in the prior art, if the water level drops below the location of the level sensor 142, the PLC 132 will add cold make up water by opening flow control valve 140. When this occurs, it will also normally be necessary for the controller 132 to control the boiler 136 and hot water flow control valves 138 to provide hot water to the heating coils 128 in order to maintain the temperature of the bath within the accepted temperature range for the given protocol programmed on the PLC 132.

FIG. 4 also illustrates a compressed air source 144 along with a control valve 146 to control the level of compressed air being supplied to the pasteurizer bath 114. The PLC 132 can optionally control the flow control valve 146 for the compressed air in accordance with the predetermined pasteurization protocol programmed on the PLC 132.

Several manufacturers make PLCs 132 suitable for this application. The PLC 132 preferably receives data from and transmits data to operational components of the system (e.g. sensors 130, 142; valves 138, 140, 146; motor advance 135; boiler 136; and alarm 152, 154) at a sampling rate of one sample per five seconds or faster. The PLC 132 preferably also includes a communications port that is capable of communicating with a conventional personal computer 148. FIG. 4 shows the computer 148 communicating with the PLC 132 via dashed line 150. It should be understood that the computer 148 may communicate by any number of means with the PLC 132, such as over an internal network, over an internet connection, wirelessly, etc. In addition, while it may be desirable to have the computer 148 on-site at the pasteurization facility, the computer 148 or one or more additional computers 148 may be located remotely. Typically, the computer 148 will have a display and a user interface such as a keyboard and mouse or a touch screen whereas the PLC 132 might not have a display and user interface. The PLC 132 will typically be programmed via the communication link 154 between the computer 148 and the PLC 132. Preferably, the computer 148 will receive data from the PLC 132 for each batch of shell eggs being pasteurized. Also, preferably real-time data from the temperature sensors 130A-130D, the status of the heating and/or cooling system, the flow rate of compressed air 146, and optionally the status of advance motor 135 are provided to the computer 148 in real-time. The real-time data can be viewed on the remote computer 148, and can also be stored for later use if necessary. As discussed in more detail below, the data is also preferably analyzed and converted in order to generate compliance reports.

Commercially provided software for the computer 148 is desirably used to program the PLC 132. The PLC programming software should not only be capable of implementing the initial setup of the PLC 132 but also to select an appropriate protocol corresponding to the egg size and start temperature for the batches being processed. For example, one of the statistically verified protocols will be chosen if batches of medium sized eggs held at room temperature are being pasteurized. At start up, the PLC 132 will instruct the heating system to warm the pasteurizer bath to the appropriate target temperature for the chosen statistically verified protocol. The PLC 132 will then instruct the advance motor 135 to move the batches of eggs in the pasteurizer bath 116 sequentially per the chosen statistically verified protocol. The PLC programming software should also be capable of transmitting collected data from the PLC 132 over the communication's link 150 to the computer 148.

For each batch the reporting software on the computer 148 assigns a batch identification number, as well as the batch start time and an identification of the batch type, namely egg size and start temperature. In addition, the reporting system on the computer 148 creates a written record of the temperature of the bath 116, and in particular the temperature within the appropriate zone of the bath 116 when the batch is located in the zone. In a system in which the batches are not moved from zone to zone, but held in place within the pasteurization bath, the reporting software preferably records the average temperature of the bath for a given portion of the overall dwell time.

In the preferred embodiment of the invention in which the batches are moved sequentially through the bath, the average temperature in the zone over the time period that the batch is in the zone is calculated and recorded for each respective batch and for each respective zone. The programmed PLC 132 monitors the average temperature for each batch in each zone, and determines when and if the average temperature in a zone while a batch is located in the zone exceeds the upper temperature control limit or falls below the lower temperature control limit. Alternatively, only the average temperature for each zone following the initial Zone 1 are monitored to determine whether the calculated average temperature falls between the upper control temperature and the lower control temperature. If the average temperature falls out of compliance for one or more zones, the PLC 132 activates a visual alarm and/or audio alarm to indicate that the batch is out of compliance. Referring to FIG. 4, the system schematically illustrates a visual alarm 152 and an audio alarm 154. The preferred visual alarm is located at the downstream end of the bath 116 and includes a red 152R, yellow 152Y and green 152G light. The illumination of the red 152R, yellow 152Y, and green 152G lights is controlled by the PLC 132. The green light 152G indicates that the system is operating properly. The yellow light 152Y indicates that the system is nearing the end of the cycle and that the advance motor 135 will soon advance the carriers signaling that the operators of the system should get ready for further processing of the carrier 118A and batch 112A being removed from the system at the end of the cycle. The red light 152R is illuminated when the exiting batch 112A has fallen out of compliance, indicating that the batch should be removed from further processing. The audio alarm 154 can be used for a number of purposes, but preferably provides a unique audio signal corresponding to the conditions for illuminating the yellow 152Y and red 152R alarm lights respectively.

Referring to FIGS. 5 through 7, after collecting data from the PLC 132, software on the computer 148 prepares a printable report 156 indicating a summary of the data for each batch of eggs pasteurized by the pasteurization system 110 for a given day. As illustrated in FIG. 5, the report 156 is preferably a daily report, see reference numeral 158. At the top of the report 156, the pasteurizer for which the report pertains is identified, see reference number 160. The overall purpose of the report 156, as mentioned, is to track each and every batch of eggs passing through the pasteurizer and provide the documentation whether the batch was subjected to proper pasteurization temperatures for the proper amount of time for the given size and start temperature for the eggs. The reporting system is able to collect information from more than one pasteurizer. The pasteurizers can be located at the same facility, or can be located at different facilities. In any event, the daily report 156 is preferably formatted so that it identifies the batches passing through a given pasteurizer at a given facility, see reference number 160.

For each pasteurizer and each day reported, the start time and date and end time and date for the report 156 are indicated at the beginning of the report, see reference number 162. hi addition, the starting batch identification number and the ending batch identification number for the report 156 are indicated, see reference number 164. The number of batches processed during the day are indicated on the report, see reference number 166, as is the averaged dwell time of the batches of eggs in the pasteurizer, see reference numeral 168, and the average temperature of the bath while the eggs are in the pasteurizer, see reference numeral 170. The report includes a chart 172 which contains batch specific information, and is shown in more detail in FIG. 7. The data in chart 172, or at least much of the data shown in chart 172, is illustrated graphically in graph 174 which is shown in more detail in FIGS. 6 and 6A.

Referring first to the chart 172 in FIG. 7, each batch is assigned a chronological batch identification number, see first column in FIG. 7, and the start time and date for the batch is recorded, see second column in FIG. 7. The third column in FIG. 7 lists the total dwell time that the batch was within the pasteurization bath. The fourth column in FIG. 7 indicates the batch type. As described previously, the batch type defines the choice of statistically verified pasteurization protocol based on egg size and start temperature. Note that a change of egg size or start temperature in the exemplary system will require the system to fully process all the batches of eggs of the first batch type (e.g. medium sized eggs at a start temperature of 45° F.) before beginning to process eggs of a second batch type (e.g. large sized eggs at starting temperature of room temperature). This is because the time and temperature are optimized for the specific batch type, and statistically verified, to provide optimum pasteurization without comprising functionality of the eggs.

The columns on the right side of FIG. 7 pertain to the temperature of the bath. The column labeled Zone 1 lists the average the temperature of the bath in Zone 1 while the respective batch was located in Zone 1. The average temperature value is in fact an average of the temperature from each of the thermocouples located in Zone 1 and time averages for the period of time in which the batch is located in Zone 1. The average temperatures listed under the columns labeled Zone 2, Zone 3 and Zone 4 are similarly calculated. To the left of the columns labeled Zone 2, Zone 3 and Zone 4 there is a column labeled C. The column labeled C contains a check mark to indicate that the temperature in that zone in the pasteurizer while the respective batch was located in that zone was in compliance with the statistically verified pasteurization protocol for the batch type (egg size and start temperature). While the exemplary chart 172 in FIG. 7 shows that batch 2528 was out of compliance in Zone 3 and batches 2431, 2532 and 2640 were out of compliance in Zone 4, under normal operation the vast majority of batches will be in compliance. The last column under the temperature heading is labeled average, and preferably contains an average of the temperature while the batch is held in the zones downstream of Zone 1, namely held in Zones 2, 3 and 4.

Figure 6A:
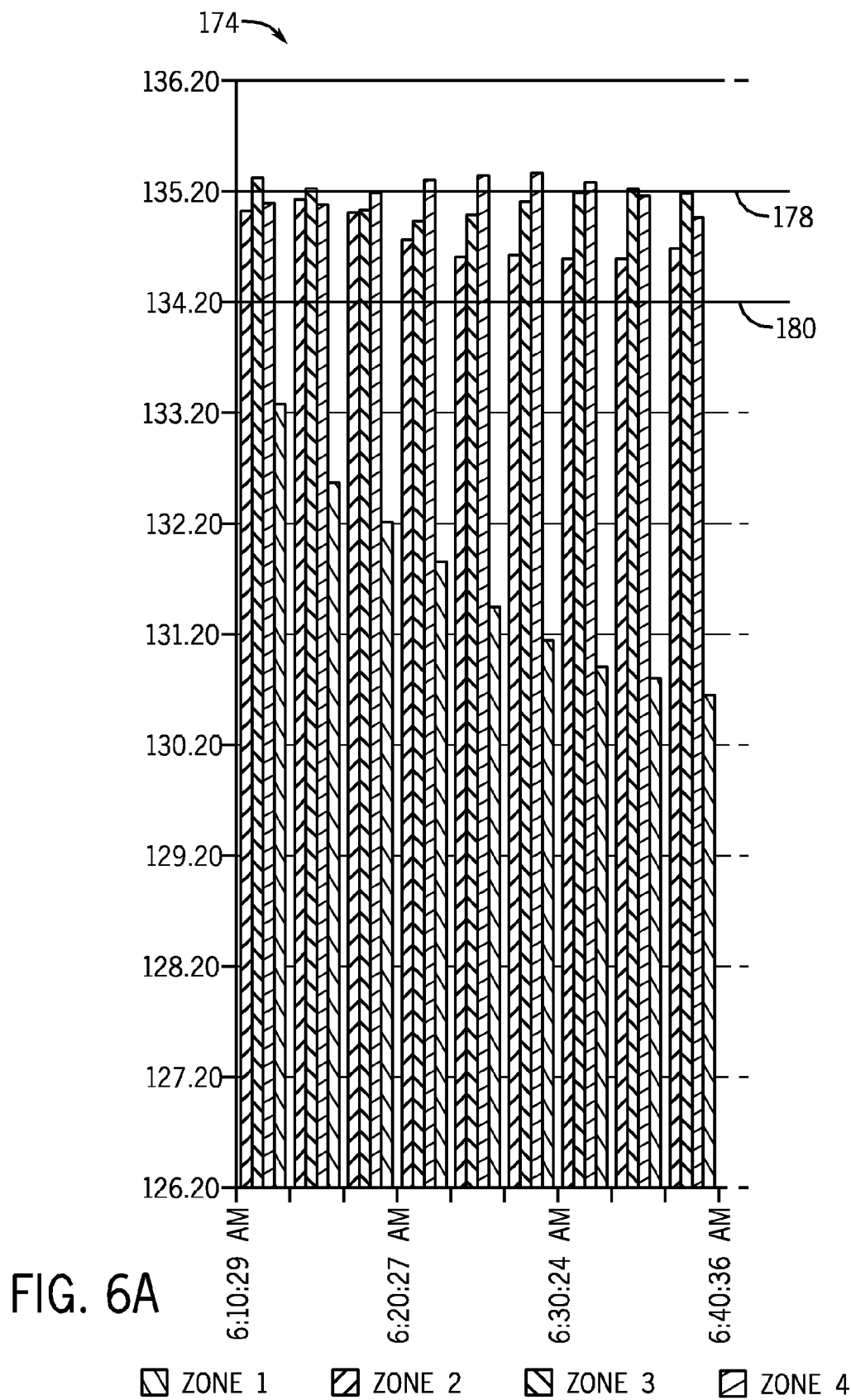
FIG. 6a is a detailed view of a portion of the graph in FIG. 6.

Referring now to FIGS. 6 and 6A, graph 174 plots the data listed in chart 172. The X-axis in FIGS. 6 and 6A identifies each individual batch by its start time. For example, the first batch in FIGS. 6 and 6A corresponds to batch number 25-28 in FIG. 7 which has a start time of 6:10 a.m. Referring in particular to FIG. 6A, which is a detailed view of the leftmost portion of the graph 174 in FIG. 6, the graph 174 includes an average temperature bar for each batch while the batch is residing in the respective zone. In FIG. 6A, for each batch the leftmost bar represents the average temperature in Zone 2, the second bar represents the average temperature in Zone 3, the third bar represents the average temperature in Zone 4, and the fourth bar represents the average temperature in Zone 1. Note that the average temperature in Zone 1 is substantially lower than the average temperature in the remaining downstream zones, as should be expected unless the protocol is adjusted to account for initial heat loss when the batch is initially set in the bath. FIGS. 6 and 6A also preferably include lines 178 and 180 which correspond to the upper control temperature and the lower control temperature for the given protocol.

Of course, the format of the report 156 should be adjusted as necessary if the protocol requires customized dwell times and temperatures. For example, in a system in which the amount of dwell time in the initial zone can be set to be different than the time in the downstream zones, the report should be changed accordingly. In addition, in the event that the selected protocol requires that the temperature at different intervals during the total dwell require different target temperatures, the report should also be likewise adjusted in order to accommodate the applicable protocol.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A shell egg pasteurization system comprising:
   a pasteurization bath containing liquid water and having a series of at least two continuous zones;
   at least one temperature sensor in each zone of the bath for measuring the water temperature in the zone of the bath;
   a heating system that operates to increase the temperature of the water in each zone of the bath to a temperature set point value, said heating system including at least one independently controlled heating element in each zone of the bath;
   a batch carrier arrangement that holds batches of shell eggs in the bath and includes an advance motor that moves the batch carrier arrangement and thereby the respective batches of shell eggs through and between zones; and
   a cooling system that operates to selectively lower the temperature of the water in the pasteurization bath when the temperature in one or more zones approaches an upper temperature limit that is set higher than the temperature set point value.

2. The shell egg pasteurization system recited in claim 1 further comprising:
   a batch processing control system is programmed with at least one pasteurization protocol based on a designated size and start temperature of shell eggs in a batch, said protocol setting the temperature set point value for the water bath, setting the upper temperature limit for the water in the bath that is higher than the temperature set point value and setting a total dwell time in the bath for each batch;
   wherein the batch processing control system receives signals from the at least one temperature sensor in each zone of the bath and is configured to operate the heating system to independently raise the temperature of the water in each zone of the bath toward the temperature set point in response to signals from the at least one temperature sensor in each respective zone, is also configured to operate the cooling system to lower the temperature of the water in the bath in response to signals from at least one temperature sensor in the bath in order to maintain the temperature of the water below said upper temperature limit, and is further configured to control the advance motor of the batch carrier arrangement to move the batches of shell eggs through the series of zones in the bath and hold each batch of shell eggs in the water for said total dwell time.

3. The shell egg pasteurization system recited in claim 1 further comprising:
   a batch processing control system that is programmed with at least one pasteurization protocol based on a designated size and start temperature of shell eggs in a batch, said protocol setting the temperature set point value for the water in the bath, setting the upper temperature limit for the water the bath that is higher than the temperature set point value for the water and setting a total dwell time in the bath for each batch;
   means for receiving signals from the at least one temperature sensor in each zone of the bath and operating the heating system to independently raise the temperature of the water in each zone of the bath toward the temperature set point in response to signals from the at least one temperature sensor in each respective zone;
   means for receiving signals from the at least one temperature sensor in the bath and operating the cooling system to lower the temperature of the water in the bath in response to signals from at least one temperature sensor in the bath in order to maintain the temperature of the water in the bath below said upper temperature limit; and
   means for controlling the advance motor of the batch carrier arrangement to move the batches of shell eggs through the series of zones in the bath and hold each batch of shell eggs in the water for said total dwell time.

4. The shell egg pasteurization system recited in claim 1 wherein the batch processing control system contains a plurality of pasteurization protocols each based on a designated size and start temperature of shell eggs in a batch, and said system further comprises a user interface that is configured to enable an operator to select an appropriate pasteurization protocol for the size and start temperature of a batch of shell eggs being pasteurized.

5. The shell egg pasteurization system recited in claim 2 further comprising an air supply system having a compressed air source and a flow control valve in communication with the bath, wherein the pasteurization protocol also sets a level of air flowing into the bath for the designated size and start temperature of shell eggs in a respective batch, and the batch processing control system is further configured to control operation of the flow control valve of the air supply system in accordance with said pasteurization protocol to control the level of air flowing into the bath.

6. The shell egg pasteurization system recited in claim 2 wherein the cooling system comprises at least one electronic cold water valve controlled by the batch processing control system in response to signals from at least one temperature sensor in the bath to add cold water into the bath in order to lower the temperature of the water in the bath when necessary to maintain the temperature of the water in the bath below said upper temperature limit.

7. The shell egg pasteurization system recited in claim 6 wherein the batch processing control system is programmed with a proportional-integral-derivative algorithm for controlling said electronic cold water valve to maintain the temperature of the water in the bath below the upper temperature limit.

8. The shell egg pasteurization system recited in claim 2 wherein each of the individually controlled heating elements comprises a heating coil located in one of the zones of the bath and an electronically controlled valve associated with the respective heating coil to control the flow of heated water through the respective heating coil, and the batch processing control system further comprises a programmable logic controller that is programmed with a proportional-integral-derivative algorithm for each of the individually controlled heating coils, each said proportional-integral-derivative algorithm using a temperature set point value defined by the pasteurization protocol and receiving a temperature feedback signal provided to the programmable logic controller from at least one temperature sensor associated with the respective heating coil, and wherein each of said proportional-integral-derivative algorithms generates a heating control signal that is transferred from the programmable logic controller to control operation of the electronically controlled valve associated with the respective heating coil.

9. The shell egg pasteurization system as recited in claim 8 wherein the heating system comprises a boiler for heating water to a predetermined boiler temperature and the programmable logic controller in the batch processing control system further comprises a proportional-integral-derivative algorithm to control the operation of the boiler, said proportional-integral-derivative algorithm for the boiler receiving a temperature feedback signal provided to the programmable logic controller from a temperature sensor associated with the boiler, and generating a boiler control signal that is transmitted from the programmable logic controller to electronically control operation of the boiler.

* * * * *